United States Patent [19]

Barthlome

[11] 3,744,850

[45] July 10, 1973

[54] AUTOMATIC TRACTION CONTROL SYSTEM

[76] Inventor: Donald E. Barthlome, 313 Orange Plank Road, Hampton, Va. 23369

[22] Filed: Mar. 8, 1971

[21] Appl. No.: 122,009

[52] U.S. Cl............ 303/21 B, 188/181 A, 303/21 F
[51] Int. Cl.............................................. B60t 8/12
[58] Field of Search....................... 73/510; 188/181, 188/349; 303/20, 6 C, 21; 324/162; 340/262; 317/5

[56] References Cited
UNITED STATES PATENTS

| | | | |
|---|---|---|---|
| 3,066,988 | 12/1962 | McRae | 303/21 F UX |
| 3,224,278 | 12/1965 | Reid et al. | 303/21 B UX |
| 3,292,977 | 12/1966 | Williams | 303/21 B |
| 3,401,984 | 9/1968 | Williams et al. | 303/21 BE |
| 3,402,973 | 9/1968 | Scibbe | 303/21 BB |
| 3,506,312 | 4/1970 | Siddall | 188/349 X |
| 3,554,613 | 1/1971 | Fiscus et al. | 303/21 B |
| 3,582,152 | 6/1971 | Burckhardt et al. | 303/21 EB |
| 3,608,978 | 9/1971 | Neisch | 303/21 EB |
| 3,512,844 | 5/1970 | Stelzer | 303/21 F |

*Primary Examiner*—Duane A. Reger
*Assistant Examiner*—Stephen G. Kunin
*Attorney*—Griffin, Branigan and Kindness

[57] ABSTRACT

A wheel traction control system is disclosed which automatically detects a maximum-traction wheel slippage and controls brake and drive systems so as to maintain this maximum-traction wheel slippage. The system essentially includes a wheel slippage detector, an automatic braking control device and an automatic accelerating control device. The wheel slippage detector comprises an angular accelerometer and a linear accelerometer, which press against one another to measure the ratio of wheel angular acceleration to vehicular linear acceleration. If wheel slippage is caused by vehicular "braking action", the wheel slippage detector sends a control signal to the automatic braking control device and if wheel slippage is caused by vehicular "accelerating action", the wheel slippage detector sends a control signal to the automatic accelerating control device. The automatic braking control device includes a brake-fluid line valve which is biased toward the closed position but which is opened by brake-fluid flow in the direction of a wheel cylinder. Further, the valve is closed tightly in response to a signal from the wheel slippage detector. The automatic accelerating control device includes an oscillator and a relay. Essentially, the accelerating control device responds to a slippage-detector signal by intermittently interrupting a vehicle's ignition circuit. Safety devices are also included to deactivate the wheel traction control system in the event of malfunctions.

11 Claims, 10 Drawing Figures

United States Patent [19]
Barthlome
[11] 3,744,850
[45] July 10, 1973
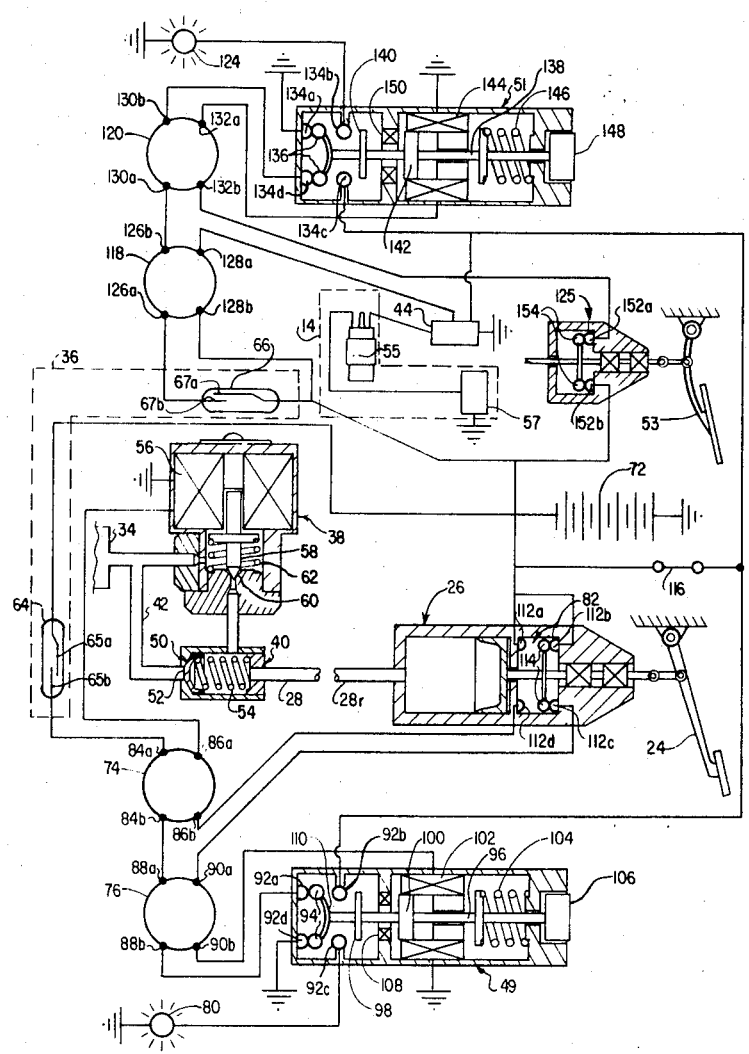

INVENTOR.
DONALD E. BARTHLOME

INVENTOR
DONALD E. BARTHLOME

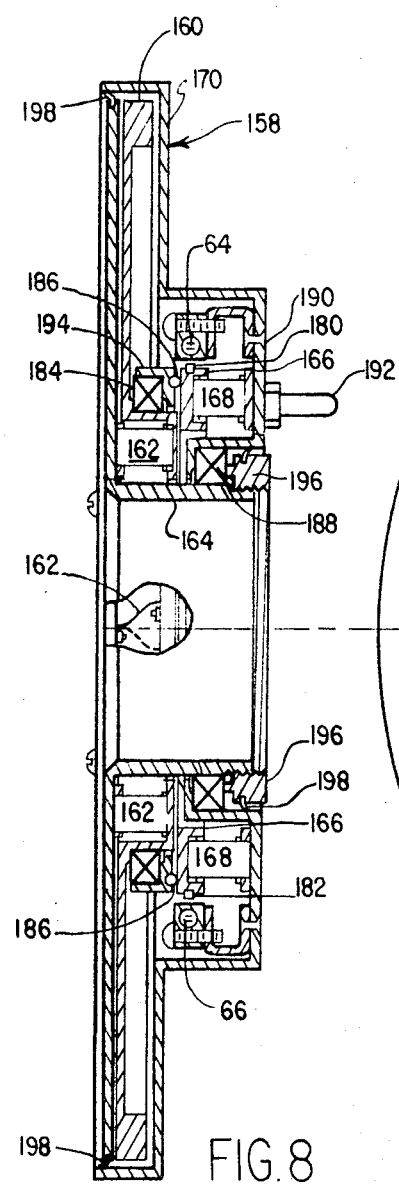
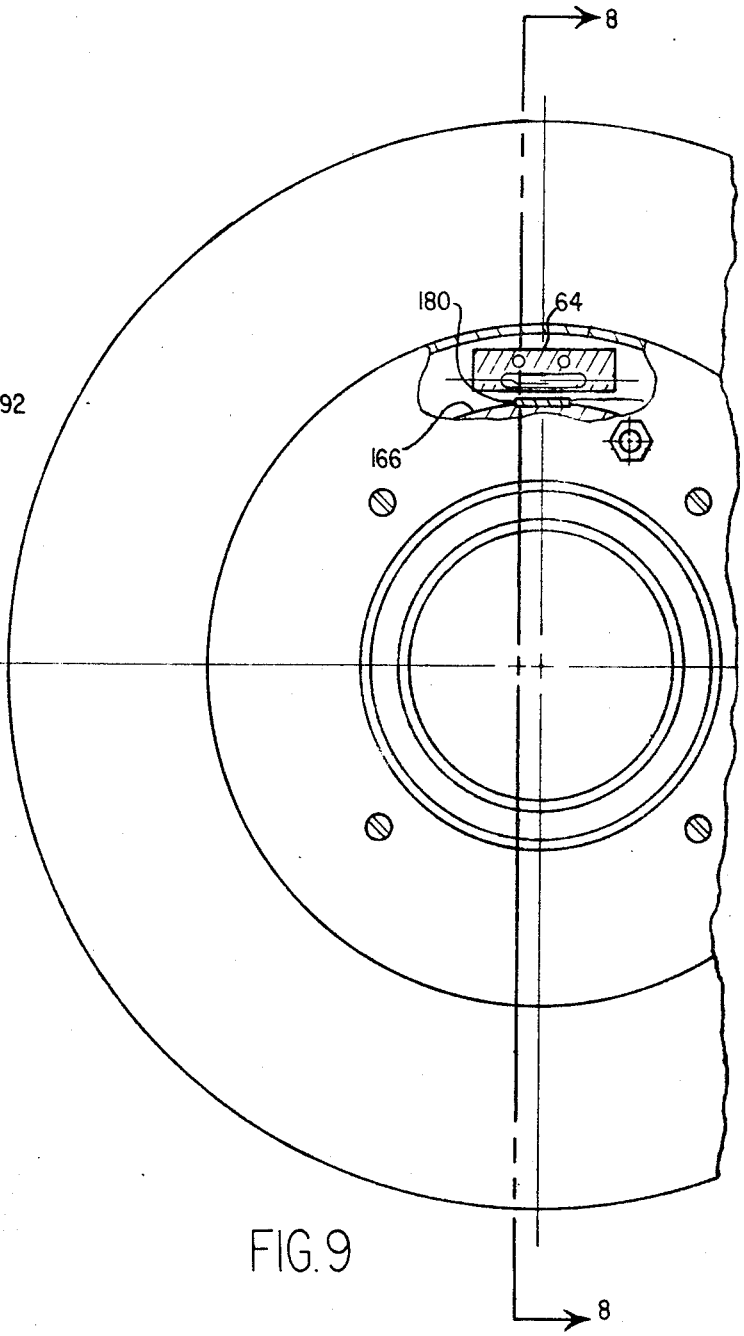
FIG. 8
FIG. 9

AUTOMATIC TRACTION CONTROL SYSTEM

This invention relates generally to the art of automatic wheel traction control systems and, in particular, it provides a system which is capable of responding to wheel slippage caused by either vehicular "braking action" or vehicular "accelerating action".

It is well known that the efficiency with which a vehicle is braked or accelerated is highly dependent upon wheel slippage. In this regard, with reference to FIG. 1, a typical braking tire-to-road coefficient-of-friction characteristic for a vehicle on dry asphalt is shown plotted versus both percent slip and time. The "time" data shown on this plot is estimated and intended for illustrative purposes only. From this characteristic curve it can be seen that maximum braking efficiency is obtained when the degree of wheel slippage reaches a value just to the left of the peak of the curve. In this regard, the "slip" to the left of the peak is due to elastic deformation of a tire whereas the "slip" to the right of the peak is due primarily to sliding of the tire on a road surface. With this in mind, the "wheel slippage" magnitude of the maximum breaking efficiency (MBE) slip can vary depending on conditions. For example, when braking on dry concrete tires can distort so severly as to permit a MBE slip as high as 15 to 20 percent whereas on wet asphalt the distortion may be only 8 or 9 percent. Braking on packed snow and ice will produce virtually no tire distortion. The time required to reach the MBE slip during a panic stop is estimated to be approximately 0.01 of a second on dry asphalt, as measured from the time a brake lining contacts a brake drum. It is desirable to design automatic traction control systems to sense when wheel slippage reaches this maximum traction efficiency point, regardless of its magnitude, and to thereafter maintain this wheel slippage.

Most prior art automatic braking control systems do not possess the following capabilities: (1) the ability to respond when a near maximum braking efficiency wheel slippage is reached regardless of its magnitude, (2) the ability to instantly stabilize brake pressure when the near maximum degree of wheel slippage is reached, and (3) the ability to maintain the brake pressure constant throughout the time duration of a panic stop. Most prior art systems, after sensing that wheel slippage has exceeded some maximum fixed value, introduce a controlled "pumping" action similar to the pumping of a brake pedal by a driver. In this manner, the degree of wheel slippage is made to continually rise above and fall below the maximum braking efficiency point, as typically indicated in FIG. 1, for braking action on dry asphalt. An example of this type of system is described in U.S. Pat. No. 3,301,608 to Harned et al. One difficulty with such systems is that they cannot take full advantage of the maximum braking efficiency point. Also, it is generally known that the application of a constant pressure on a brake pedal produces a much more effective braking action than does an intermittent or "pumping" type action. Therefore, it is an object of this invention to provide an automatic braking control system which can respond when some maximum desirable degree of slip is reached and then to lock brake-fluid pressure so as to maintain this degree of slippage throughout a panic stop.

Because they produce a "pumping action" most prior art automatic braking control systems provide noticeable responses which are sensed by drivers or passengers of vehicles. Such responses can be distracting to drivers and, therefore, can be dangerous. It is therefore yet another object of this invention to provide an automatic traction control system the operation of which is not distracting either to drivers or passengers.

In addition, some prior art systems do not provide slippage detection and control for all four wheels. A primary reason for this limitation is that a four wheel system is too expensive. For example, in some such systems the slippage of only one or two wheels may cause a reduction of brake-fluid pressure simultaneously at all four wheels. Or, in other such systems, two wheels must slip before the systems are activated. Such systems clearly do not provide the flexibility required to obtain near maximum braking efficiency for all four wheels. Therefore, it is another object of this invention to provide an automatic braking system which has separate detecting units for each wheel and separate control units for each set of front and rear wheels, but yet which is economically practical.

Although some prior art automatic traction control systems have detectors which respond to wheel slippage arising from either excessive vehicular "braking action" or excessive vehicular "accelerating action", few systems have one detector for detecting both types of wheel slippage. Accordingly, it is an object of this invention to provide an automatic traction control system having a slippage detector for detecting wheel slippage, arising from either excessive braking action or excessive accelerating action and providing control signals which are characteristic of each of these types of slippages.

Still another disadvantage with many prior art automatic traction control systems is that they are somewhat unsafe. That is, they do not have sufficient mechanisms to protect against "wheel lock" caused by system malfunctions. Therefore, it is another object of this invention to provide a system which has a built-in safety margin against malfunctions.

Yet another problem with some prior art automatic traction control systems is that their wheel slippage detectors are unduly complex. For example, in some such prior art systems an electronic comparator circuit must be employed to compare a vehicular linear acceleration signal with a wheel angular acceleration signal. It is therefore another object of this invention to provide an automatic traction control system having a wheel slippage detector which is not unduly complex.

SUMMARY OF THE INVENTION

According to the principles of this invention an automatic traction control system has a fast-response wheel-slippage detector for providing control signals to both an automatic braking control system and an automatic accelerating control system.

Generally, the slippage detector includes a sensor unit made up of a wheel angular accelerometer and a wheel linear accelerometer, which together measure the ratio of angular acceleration to linear acceleration. The accelerometers press against one another, each pressing with a force proportional to the acceleration it is measuring. When the vehicle accelerates, the pressing force of one accelerometer overcomes that of the other accelerometer producing a physical displacement of accelerometers. When this displacement reaches a predetermined magnitude a measuring means in the detector provides a slippage warning signal to either the automatic braking control system or the automatic accelerating control system, depending on whether the wheel slippage is caused by vehicular "braking action" or "accelerating action". The slippage detector responds virtually instantaneously to the maximum-traction-efficiency slippage, regardless of its magnitude.

The automatic braking control system comprises a brakefluid locking device. In the preferred embodiment the locking device is a solenoid actuated valve. A significant feature of the valve is that its plunger is normally biased in the closed position but can ordinarily be opened by brake fluid flow in the direction of a wheel cylinder when a vehicle's brakes are applied. However, when the valve receives a slippage-warning signal from the slippage detector the plunger is forced toward a closed position and brake fluid can no longer flow through the valve. The valve has an unusually quick response time by virtue of the fact that actual brake-fluid flow ceases as soon as a brake lining contacts a brake drum; thus, when the valve receives a slippage warning signal the plunger has already moved to an almost closed position. When the brake is released brake fluid is allowed to flow around the valve, through a bypass line and check valve.

Essentially, the cumulative response time of the slippage detector and the automatic braking system is fast enough so that the automatic braking system can lock the brake system of a vehicle at a wheel slippage closely corresponding to the maximum braking efficiency (M.B.E.) slippage detected by the slipppage detector.

The particular automatic accelerating control system employed in this invention is old in the art. Generally this system controls a vehicle's acceleration by intermittently interrupting the vehicle's ignition circuit in response to a slippage warning signal.

The automatic traction control system of this invention also includes safety devices which deactivate the automatic braking and accelerating control systems in the event of malfunctions.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

FIG. 8 is a front sectional view of the slippage detector of FIG. 9; taken along line 8—8; and, FIG. 9 is a partially cutaway side view of a slippage detector employing principles of this invention, showing in some detail the measuring means therefor.

DESCRIPTION OF THE PREFERRED EMBODIMENT

Figure 2:
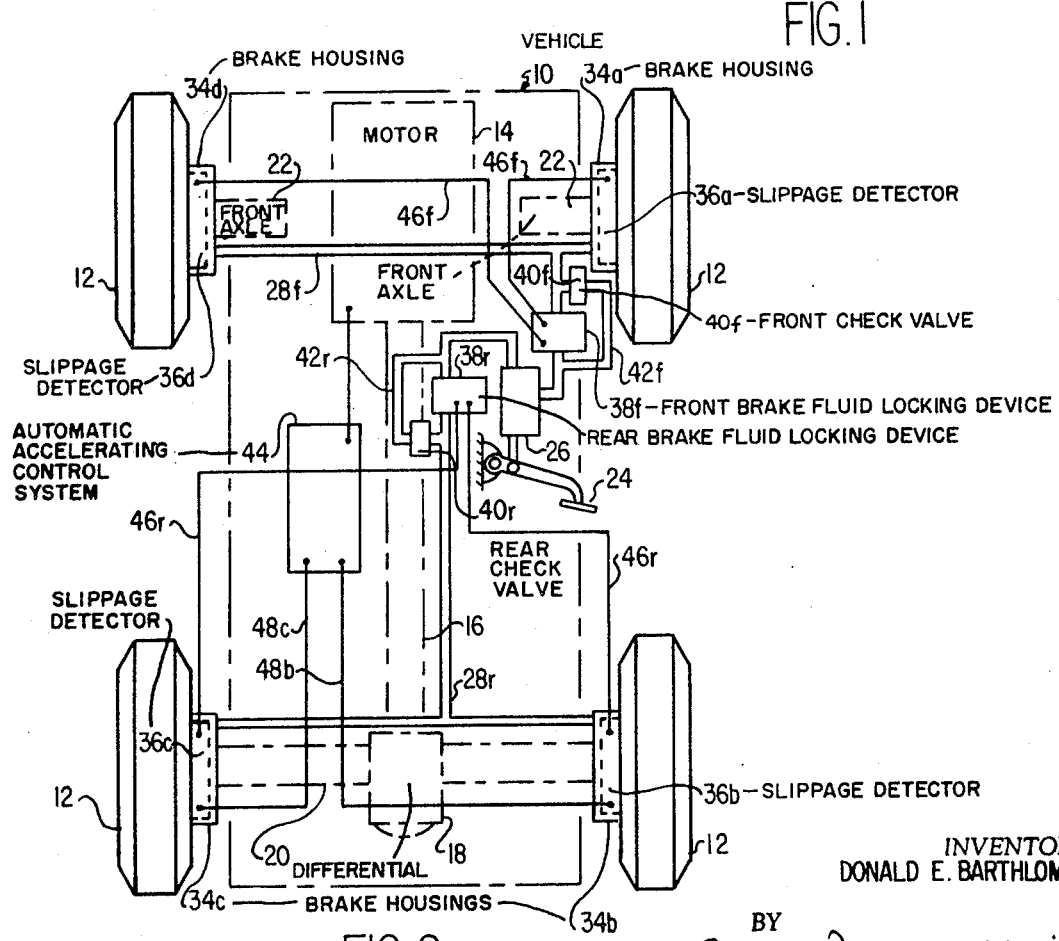
FIG. 2 is a simplified block diagram representing an automatic traction control system employing principles of this invention.

For purposes of orientation, reference is first made to the block diagram in FIG. 2 wherein is shown an automatic traction control system mounted on a vehicle 10 having wheels 12, a motor 14, a drive shaft 16, a differential 18, a back axle 20, front axles 22, a brake pedal 24, a master cylinder 26, brake-fluid lines 28$f$ and 28$r$, and four brake housings 34 a–d.

The automatic traction control system includes: four slippage detectors 36 a–d (one mounted in each of the brake housings 34 a–d), two automatic braking control systems (brake-fluid locking devices) 38$f$ and 38$r$, two check valves 40$f$ and 40$r$ with associated bypass lines 42$f$ and 42$r$, and an automatic accelerating control system 44.

A front brake fluid locking device 38$f$ is connected in the brake fluid line 28$f$ between the master cylinder 26 and the front brake housings 34 a and d. A rear brake fluid locking device 38r is connected in the brake fluid line 28$r$ between the master cylinder 26 and the rear brake housings 34b and c. Further, each of the check valves 40, with its associated bypass line 42 respectively provides a bypass around one of the brake fluid locking devices 38. Each of the slippage detectors 36 is mounted in a brake housing 34 so as to detect wheel slippage. The slippage detectors 36 on the front and rear wheels are electrically connected to the brake fluid locking devices 38 by brake signal lines 46$f$ and $r$ respectively. In addition, each of the back wheel slippage detectors 36 b and c is connected to the automatic accelerating control system 44 by a respective one of the acceleration lines 48 b and c.

Turning now to the operation of the simplified system illustrated in FIG. 2, when the brake pedal 24 is depressed the master cylinder 26 causes pressure to increase in the brake-fluid lines. This pressure is transmitted through the brake fluid locking devices 38 and the front and rear brake fluid lines 28 $f$ and $r$ to brake linings (not shown) in the brake housings 34. When the brake pedal 24 is released, brake fluid is allowed to return to the master cylinder 26 through the check valves 40 and the bypass lines 42.

Figure 1:
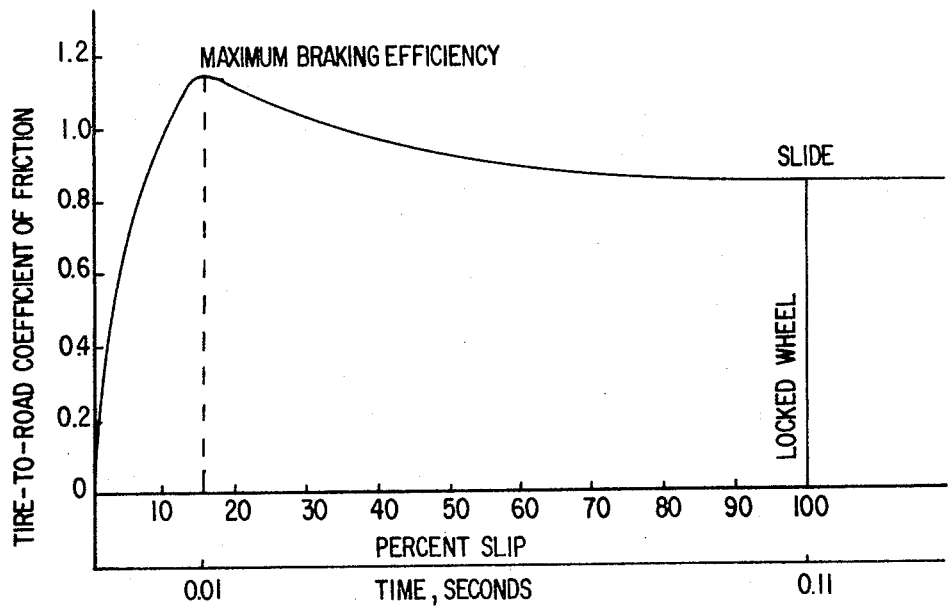
FIG. 1 is a graphical representation of a typical coefficient-of-friction characteristic of a vehicle's wheel.

Now assume that a driver depresses the brake pedal 24 violently. When the brake fluid pressure is transmitted to the brake linings (not shown), as is described above, the rotation of wheels 12 decelerates rapidly and the wheels begin to slip in accordance with the characteristic curve shown in FIG. 1. When the degree of wheel slippage reaches maximum braking efficiency the slippage detectors 36 a–d (assuming all wheels are slipping in the same manner under similar conditions) detect that the maximum-braking-efficiency slippage has been reached and independently signal the brake fluid locking devices 38 $f$ and $r$ to that effect. The brake fluid locking devices 38 f and r lock the brake fluid line 28 so that the brake fluid pressures, as seen at the brake linings in the brake housings 34, are locked at pressures closely corresponding to the pressures which caused the maximum-braking-efficiency slippage. Thus, once the automatic braking system goes into effect, the brakes are locked near the maximum-braking-efficiency wheel slippage.

The slippage detectors 36 of this invention (described in detail below) and the brake fluid locking devices 38 (also described in detail below) have extremely short response times and therefore enable the general system shown in FIG. 2 to operate as described above.

The back wheel slippage detectors 36 b and c provide acceleration slippage signals, on the acceleration signal lines 48 b and c, to the automatic accelerating control system 44. The automatic accelerating control system 44, in turn, controls the rate at which the motor 14 causes the back wheels 12 to accelerate. More particularly, when a car is accelerated too rapidly and its "back wheel slippage" nears the maximum-accelerating-efficiency slippage (similar to the maximum-braking-efficiency slippage shown in FIG. 1) the slippage detectors 36 b and c independently provide signals to the automatic accelerating control system 44. The automatic accelerating control system 44 controls the motor 14 which in turn reduces the power delivered to the back wheels 12 in a manner to be described below.

Figure 3:
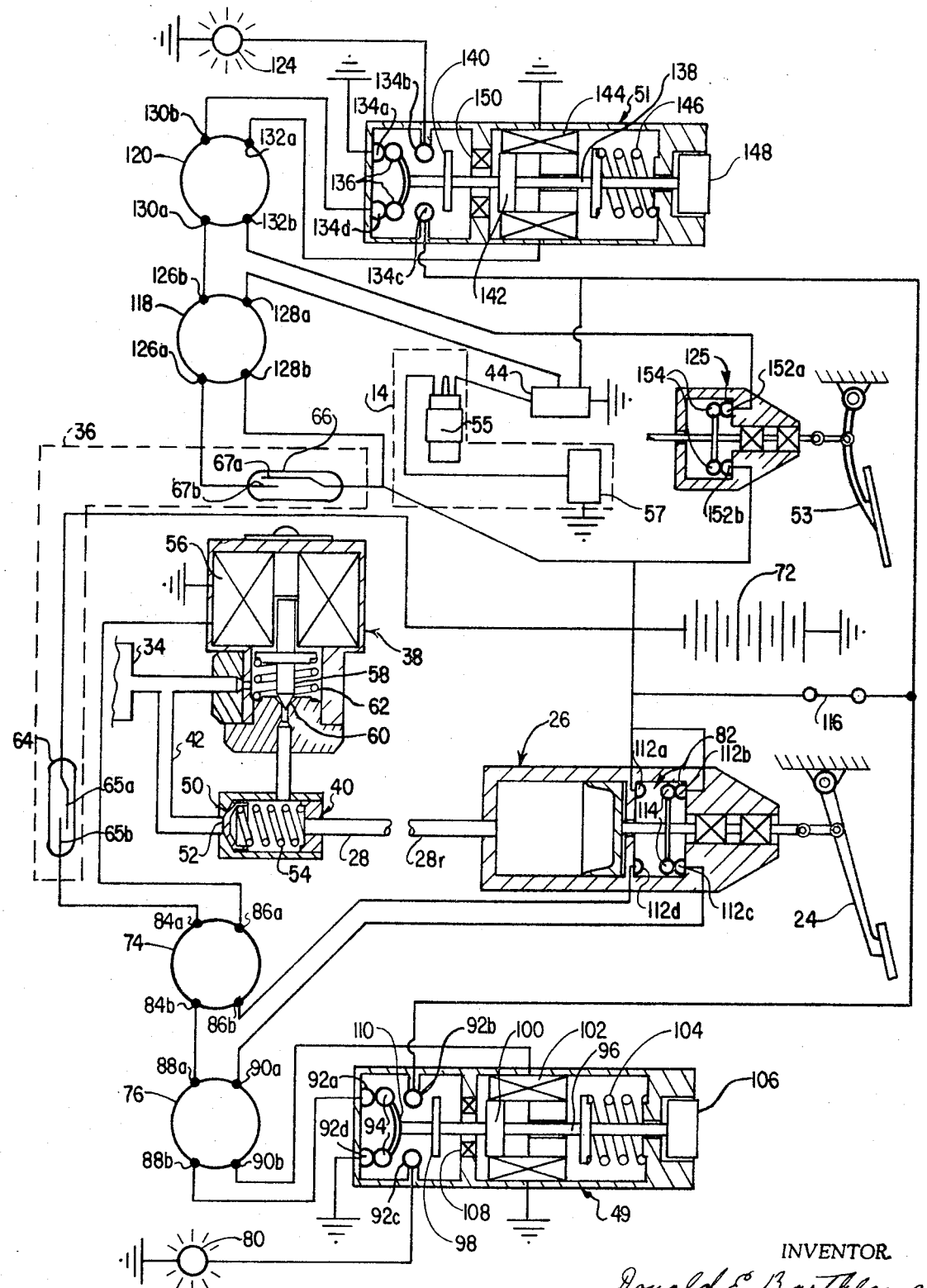
FIG. 3, is a schematic representation of an automatic traction control system employing principles of this invention.

Referring next to the FIG. 3 schematic representation of part of the same automatic traction control system shown in FIG. 2 with additional elements added, there is shown one of the slippage detectors 36 (represented by dashed lines and shown in more detail in FIGS. 4-9), one of the brake fluid locking devices 38, one of the check valves 40 with its associated bypass line 42, and the automatic accelerating control system 44. Additional elements of the automatic traction control system shown in FIG. 3, but not shown in FIG. 2, are various elements of electrical circuitry (to be described below) which include safety switches (braking system safety switch 49 and accelerating system safety switch 51). Elements of a vehicle shown in FIG. 3 include: the brake pedal 24, the master cylinder 26, the brake fluid line 28, a brake housing 34, an accelerator pedal 53, and the motor 14 (represented by dashed lines) with an ignition coil 55 and a distributor 57.

Describing firstly the automatic braking control system of FIG. 3, the check valve 40 includes a check valve seat 50, a check valve poppet 52 and a check valve biasing spring 54. The biasing spring 54 normally biases the check valve poppet 52 in a closed position. Flow of brake fluid from the master cylinder 26 toward the brake housing 34 is prevented from going through the bypass line 42 by the valve poppet 52, however, brake fluid flowing from the brake housing 34 toward the master cylinder 26 overcomes the check valve biasing spring's tension and thereby unseats the check valve poppet 52.

The brake fluid locking device 38 essentially comprises a solenoid coil 56, a plunger 58, a solenoid valve seat 60, and s solenoid valve supporting spring 62. The plunger 58 is normally held in a seated position against the solenoid valve seat 60 by its own weight. However, a flow of brake fluid from the master cylinder 26 toward the brake housing 34 unseats the plunger 58; thus, allowing flow of brake fluid away from the master cylinder 26 through the brake fluid locking device 38. The support spring 62 provides lift to the plunger 58, thereby creating a desired sensitivity of plunger movement to fluid flow. Thus, fluid flow away from the master cylinder 26 is through the brake fluid locking device 38 and brake fluid flow toward the master cylinder is through the bypass line 42.

When the solenoid coil 56 is energized the plunger 58 is pressed tightly against the solenoid valve seat 60 thereby preventing flow of brake fluid from the master cylinder 26 toward the brake housing 34 through the brake fluid locking device 38.

It can be seen in FIG. 3 that the slippage detector 36 comprises a braking magnetic reed switch 64 having two contacts 65 a and b and an accelerating magnetic reed switch 66 having two contacts 67 a and b. Also included in the slippage detector is a slippage sensor unit which is shown in more detail in FIGS. 4-9 but which is not included in FIG. 3. The slippage sensor unit causes movement of a magnet (not shown in FIG. 3) in response to the maximum traction wheel slippage so as to activate either the braking reed sensor switch 64 or the accelerating magnetic reed switch 66.

Operation of the FIG. 3 automatic braking system is as follows: As the brake pedal 24 is depressed the master cylinder 26 causes an increase in pressure in the brake line 28. At the same time, brake fluid flows through the check valve 40 to the brake fluid locking device 38. The plunger 58, which is seated under the action of its own weight, is forced away from the valve seat 60 by brake fluid flow. However, once there is sufficient brake fluid pressure to cause a brake lining (not shown) to contact a brake drum (not shown) in the brake housing 34, brake fluid flow through the brake fluid locking device 38 ceases and the plunger 58 settles back toward the valve seat 60. If the brake pedal 24 is released, brake fluid flows from the brake housing 34 toward the master cylinder 26 through the bypass line 42 and the check valve 40.

Now suppose the brake pedal 24 is depressed violently for a panic stop. Brake fluid pressure is transmitted to the brake lining (not shown) in the brake housing 34 as was described above. Once the brake lining (not shown) contacts the brake drum (not shown) the wheels of a vehicle begin to slow down and to slip on pavement in accordance with the wheel slippage characteristic curve shown in FIG. 1. At zero time of FIG. 1 brake fluid flow through the brake fluid locking device 38 essentially ceases and the plunger 58 begins to settle back toward the solenoid valve seat 60. By the time the wheel slippage has reached a desirable degree of slip the plunger 58 is again seated, or close to being seated, on the valve seat 60. Very near this desirable wheel slippage the solenoid coil 56 is energized in response to a slippage warning signal from the slippage detector 36 (the energizing circuit and slippage detector are described below) and the plunger is held tightly against the solenoid valve seat 60, thus, locking the braking system near a degree of wheel slippage which produces maximum braking efficiency.

It can be appreciated by those skilled in the art that the brake fluid locking device 38 has an extremely short response time due to the fact that the plunger is actually seated, or almost seated, prior to activation of the locking device. A significant structural feature of the brake fluid locking device 38 is the biased plunger, which is biased toward a seated position, but yet which is opened by brake fluid flow from the master cylinder toward the brake lining as long as the solenoid coil 56 is not energized.

Turning secondly to the automatic accelerating control system 44 of FIG. 3, this system is connected to the ignition coil 55 of the motor 14. The ignition coil 55 is connected directly to the spark plugs (not shown) of the motor 14 and to ground through the contact breaker (not shown) of the distributor 57. The automatic accelerating control system 44 is old in the art and therefore not shown in detail in FIG. 3. This system includes mainly a voltage controlled oscillator and an electromechanical relay for intermittently interrupting current flowing to the ignition coil 55.

Briefly, activation of the accelerating magnetic reed switch 66, in response to a desirable wheel slippage, activates the automatic accelerating control system 44 which, in turn, operates on the ignition circuit to control the power output of the motor 14.

Turning thirdly to the electrical circuitry of FIG. 3, including the safety switches, the circuitry is made up of a braking-system circuit and an acclerating-system circuit.

The braking system circuit includes the voltage source 72, the braking sensor reed switch 64, an energizing relay 74, a safety relay 76, the braking safety switch 49, a malfunction alarm light 80, and a brake pedal switch 82 (which is a part of the master cylinder 26).

The voltage source 72 is a vehicle battery.

The energizing relay 74 is a solid state relay having two control terminals 84 $a$ and $b$ and two transmission terminals 86 $a$ and $b$.

Likewise, the safety relay 76 is a solid state relay having two control terminals 88 $a$ and $b$ and two transmission terminals 90 $a$ and $b$. The relays 74 and 76 are constructed such that when a current flows through the control terminals 84 $a$ and $b$ 88 $a$ and $b$ circuits are respectively completed through the transmission terminals 86 $a$ and $b$ and 90 $a$ and $b$.

The braking safety switch 49 comprises four stationary contacts 92 $a$–$d$, two electrically-interconnected movable contacts 94, a plunger 96, a magnetic plunger retaining means 98, an armature 100, a solenoid coil 102, a biasing spring 104, a push button 106, and a permanent retaining magnet 108. The plunger 96 is normally biased by the biasing spring 104 such that movable interconnected contacts 94 are respectively in contact with the third and fourth stationary contacts 92 $a$ and $d$. Energizing the solenoid coil 102 causes the armature 100 and the attached plunger 96 to move to the right as seen in FIG. 3. However, as the plunger 96 moves to the right the movable contacts 94 continue to make contact at first with the first and fourth stationary contacts 92 $a$ and $b$, due to the resilience of an interconnecting member 110. Finally, the magnetic plunger retaining means 98 comes under the influence of the permanent retaining magnet 108, at which point, the movable contacts 94 break contact with the first and fourth stationary contacts 92 $a$ and $d$. Once the movable contacts 94 make contact with the second and third stationary contacts 92 $b$ and $c$, the braking safety switch 49 is held in this position by the permanent retaining magnet 108 until an external force is applied to the push button 106.

The brake pedal switch 82 comprises four stationary contacts 112 $a$–$d$ and two electrically-interconnected movable contacts 114. When no force is applied to the brake pedal 24 the movable contacts 114 are respectively in contact with the second and third stationary contacts 112 $b$ and $c$. However, when a force is applied to the brake pedal 24 the movable contacts 114 are moved into respective contact with the first and fourth stationary contacts 112 $a$ and $d$.

The malfunction alarm light 80 is connected between the third stationary contact 92 $c$ of the safety switch 49 and ground, and is located on a vehicle's dashboard.

Tracing the circuit of the automatic brake control system, the voltage source 72 is connected to the first contact 65$a$ of the reed switch 64. The second reed switch contact 65$b$ is connected to the first control terminals 84$a$ of the energizing relay 74 and the second control terminal 84$b$ is connected to the first control terminal 88$a$ of the safety relay 76. The second control terminal 88$b$ of the safety relay is coupled to the first safety switch stationary contact 92$a$ and the fourth stationary contact 92$d$ is connected to ground.

The voltage source 72 is also connected directly to the brake pedal switch's first and second stationary contacts 112$a$ and 112$b$. The brake pedal switch's fourth stationary contact 112$d$ is connected to the second transmission terminal 86$b$ of the energizing relay 74 and the first transmission terminal 86$a$ is coupled through the locking-device solenoid coil 56 to ground. The brake pedal switch's third stationary contact 112$c$ is connected to the first transmission terminal 90$a$ of the safety relay 76 and the second transmission terminal 90$b$ is connected through the safety-switch solenoid coil 102 to ground.

Further, the voltage source 72 is connected through a vehicle ignition switch 116, which is closed when the vehicle is in operation, to the safety switch's second stationary contact 92$b$. The third stationary contact 92$c$ of the safety switch 49 is connected through the malfunction alarm light 80 to ground.

Now describing the operation of the part of the braking system circuit which energizes the solenoid coil 56, as the brake pedal 24 is depressed, the movable contacts 114 of the brake pedal switch 82 are separated from the second and third stationary contacts 112 $b$ and $c$ and brought into contact with the first and fourth stationary contacts 112 $a$ and $d$. If the wheels of a vehicle begin to slip, and the degree of slippage approaches that which provides maximum braking efficiency, a slippage sensor unit (which is a part of the slippage detector 36, but not shown in FIG. 3) brings a permanent magnet in close proximity to the braking magnetic reed switch 64 and thereby causes the reed switch contacts 65 $a$ and $b$ to close. Once the reed switch's contacts 65 are closed current flows between the control terminals 84 $a$ and $b$ of the energizing relay 74 thereby completing the circuit between the transmission terminals 86 of the energizing relay 74. Thus, a circuit is completed from the voltage source 72 through the solenoid coil 56 and the plunger 58 is thereby driven downwardly.

Next describing the operation of the safety part of the braking system circuit which deactivates the automatic braking control system in the event of a malfunction, closing the reed switch contacts 65 (as described above), in addition to activating the energizing relay 74, also causes a current between the control terminals 88 of the braking safety relay 76. This, in turn, closes the circuit between the transmission terminals 90 of the safety relay 76. However, the solenoid coil 102 of the braking safety switch 49 is not thereby energized because the brake pedal switch's second and third stationary contacts 112 $b$ and $c$ are open. However, suppose the brake pedal is released but yet the reed contacts 65 of the reed switch 64 improperly remain in a closed condition. Current now flows between the second and third stationary contacts 112 b and c due to the electrically-interconnected movable contacts 114 thereby energizing the solenoid coil 102, which in turn, causes the armature 100, and its attached plunger 96, to be moved to the right, as seen in FIG. 3, against the force of the biasing spring 104. Movement of the plunger 96 opens the first and fourth stationary contacts 92 a and d and closes the second and third stationary contacts 92 b and c. First and fourth contacts 92 a and d, however, must remain closed until the magnetic plunger retaining means 98 is sufficiently attracted by the permanent retaining magnet 108 to insure closure of the second and third stationary contacts 92 b and c. This is provided by a built-in resilience in the interconnecting member 110 of the electrically-connected movable contacts 94 as was described above. The closure of the second and third stationary contacts 92 b and c permits current to flow from the voltage source 72 through the ignition switch 116 to the braking system malfunction alarm light 80, which is mounted on the vehicle's dashboard.

In a similar manner, opening the first and fourth stationary contacts 92 a and d deenergizes the solenoid coil energizing relay 74 and thereby opens the circuit to the solenoid coil 56 of the brake fluid locking device 38. Thus, the brake fluid locking device 38 is disabled.

Likewise, should the braking magnetic reed switch 64 be improperly activated by forces other than those arising from a braking action, the second and third stationary contacts 112 b and c of the brake pedal switch 82 will be in a "closed" position and the sequence of events will be identical to those described in the preceding paragraph, thus resulting in activation of the brake system malfunction alarm light 80 and disabling of the locking device 38.

Thereafter, in either case, the braking system safety switch 49 is held in a "safe" position by the permanent retaining magnet 108 until the plunger 96 is pushed to the left as seen in FIG. 3 by pushing the push button 106 manually. When the braking system safety switch 49 is in the "safe" position the braking systems functions as a conventional manual braking system.

The automatic accelerating system control circuit is much the same as the automatic braking system control circuit and essentially comprises: the voltage source 72 (described previously), the acceleration sensor reed switch 66 (described previously), an energizing relay 118, a safety relay 120, the safety switch 51, a malfunction alarm light 124, and an accelerator pedal switch 125.

The energizing relay 118 is a solid state relay which has two control terminals 126 a and b and two transmission terminals 128 a and b.

Likewise, the safety relay 120 is a solid state relay which has two control terminals 130 a and b and two transmission terminals 132 a and b.

The accelerating system safety switch 51 is identical to the braking system safety switch 49 in both structure and operation, as was described above, however, for ease of reference the elements thereof are given numerical designations as follows: four stationary contacts 134 a–d, two electrically-interconnected movable contacts 136, a plunger 138, a magnetic plunger retaining means 140, an armature 142, a solenoid coil 144, a biasing spring 146, a push button 148 and a permanent retaining magnet 150.

The accelerator switch 125 includes two stationary contacts, 152 a and b, and two electrically-interconnected movable contacts 154. The movable contacts 154 are linked with an accelerator pedal 53 such that when the accelerator pedal 53 is not depressed the movable contacts 154 are respectively in contact with the first and second stationary contacts 152 a and b; however, when the accelerator pedal 53 is depressed, the movable contacts 154 are taken out of contact with the stationary contacts 152 a and b.

Tracing the automatic accelerating control system circuit, the voltage source 72 is connected to the first reed contact 67a of the slippage sensor switch 66. The second reed contact 67b of the slippage sensor switch 66 is connected through the control terminals 126 of the oscillator energizing relay 118 and the control terminals 130 of the safety relay 120 to the fourth stationary contact 134d of the safety switch 51. The first stationary contact 134a of the safety switch 51 is connected to ground.

Further, the voltage source 72 is connected to the second transmission terminal 128b of the energizing relay 118 and the first transmission terminal 128a of the energizing relay 118 is connected to the automatic accelerating control system 44. The automatic accelerating control system 44 is, in turn, connected through the vehicle ignition coil 55 and the distributor 57 to ground. The automatic accelerating control system 44 also is coupled directly to the power source 72 through the vehicle ignition switch 116.

In addition, the power source 72 is coupled to the second stationary contact 152b of the accelerator switch 125. The first stationary contact 152a of the accelerator switch 125 is connected to the second transmission terminal 132b of the safety relay 120, and the first transmission terminal 132a of the safety relay 120 is connected through the safety switch solenoid coil 144 to ground.

The voltage source 72 is further connected through the ignition switch 116 to the third stationary contact 134c of the safety switch 51. The second stationary contact 134b of the safety switch 51 is connected through the malfunction alarm light 124 to ground.

Now describing the operation of the part of the accelerating control circuit of FIG. 3 which energizes the automatic drive system 44, as the accelerator pedal 53 is depressed the wheels of a vehicle are caused to accelerate and thereby to slip on a pavement. When the degree of wheel slippage nears the point of maximum traction efficiency, similar to that shown in FIG. 1, a slippage sensor unit (to be described below in conjunction with FIGS. 4–9) of a slippage detector 36 brings a magnet adjacent to the accelerating magnetic reed switch 66, thereby closing the reed contacts 67. Closure of these contacts activate the oscillator energizing relay 118 thereby allowing current flow from the voltage source 72 through the transmission terminals 128 to the automatic drive system 44, which comprises primarily a voltage controlled oscillator (not shown) and an electromechanical relay (not shown). The voltage controlled oscillator of the automatic drive system 44 is turned on by the signal it receives through the transmission terminals 128 a and b and it, in turn, causes an electromechanical relay (not shown) to interrupt current flowing through it from the voltage source 72 through the ignition switch 116 to the ignition coil 55 and the distributor 57.

The oscillator (not shown) produces a 50 cycle/second square wave signal which causes the electromechanical relay (not shown) to make and break the ignition circuit approximately once every ten milliseconds. By thusly controlling the current flowing to the coil 55, the distributor 57, and spark plugs (not shown) the power of the motor 14 is also controlled so as to maintain a desirable wheel slippage condition.

With regard to operation of the safety part of the acclerating system circuit, if the accelerator pedal 53 is released thereby closing the accelerator switch 125, but the slippage sensor unit (not shown in FIG. 3) improperly continues to close the reed contacts 67 $a$ and $b$, the solenoid coil 144 of the safety switch 51 is activated by a current flowing from the voltage source 72 through the accelerator switch 125 and the safety relay 120. The automatic acceleration control system is thereby deactivated in the same manner as was the automatic braking control system described above.

Turning now to the actual slippage sensor elements of the slippage detectors 36 shown in FIGS. 2 and 3, reference is made to FIGS. 4-9. FIGS. 4-7 illustrate a simplified slippage sensor unit 158. The sensor unit 158 comprises essentially a rotational mass 160, rotational-mass springs 162, a rotationalmass mounting plate 164 attached to a wheel 165, a linear mass 166, linear mass springs 168, a linear mass mounting plate 170 attached to a vehicle's frame 171, and a bearing assembly 172.

The flat, rectangularly shaped, rotational-mass springs 162 are radially oriented between the rotational-mass mounting plate 164 and the rotational mass 160 and are attached to both these members. The linear-mass springs 168 are oriented in vertical parallel planes and are attached between the linear-mass 166 and the linear-mass mounting plate 170. Again, it should be particularly noted that the rotational-mass springs 162 are mounted in radially disposed planes whereas the linear-mass springs 168 are mounted in parallel vertical planes.

Figure 4:
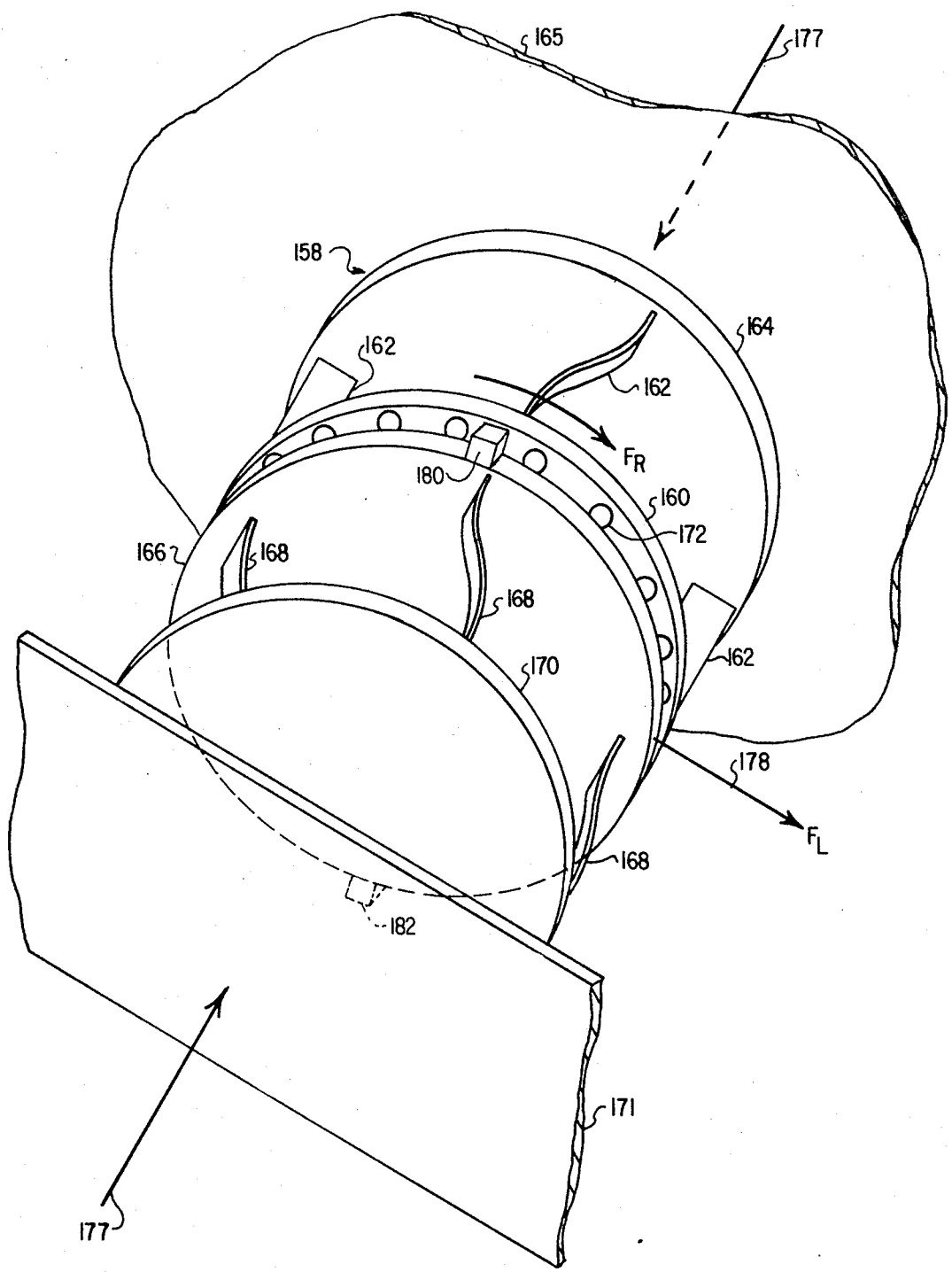
FIG. 4 is a simplified isometric view of a wheel-slippage-detector sensor unit which employs principles of this invention.

The rotational-mass mounting plate 164 is attached to a rotating member of a wheel 165 and rotates therewith. The rotational mass 160 is thereby caused to rotate through the rotational mass springs 162. The linear-mass mounting plate 170, on the other hand, is affixed to a non-rotating member of a vehicle's frame 171 and therefore this member, as well as the linear mass 166, does not rotate. The rotational-mass mounting plate 164 and the linear-mass mounting plate 170 are pushed toward one another by a static force indicated by arrows 177 which is created when the slippage sensor unit 158 is mounted on a vehicle as will be explained in more detail below. The static force 177 causes the linear-mass springs 168 and the rotational-mass springs 162 to bend as is shown in FIG. 4 so that the rotational mass 160 is angularly displaced in a counter clockwise direction (as seen in FIG. 4) from the rotational-mass mounting plate 164. This displacement can be more clearly seen in FIGS. 7a and 7b wherein it is represented by the letter A. The linear mass 166 is linearly displaced to the left (as seen in FIG. 4) from the linear-mass mounting plate 170. Thus, the springs 162 and 168 are preloaded and cause the masses 160 and 166 to press against one another through the bearing assembly 172.

The bearing assembly 172 allows both relative rotational and linear motion between the rotational mass 160 and the linear mass 166.

There are two switching magnets, a braking switching magnet 180 and an accelerating switching magnet 182 respectively mounted on the top and bottom of the linear mass 166. These magnets cooperate with the slippage reed sensor switches 64 and 66 (FIG. 3) as will be described shortly.

Figure 6:
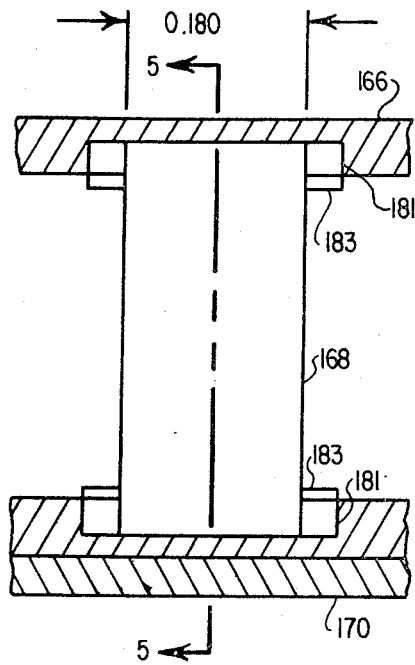
FIGS. 5 and 6 are sectional views of portions of the sensor unit of FIG. 4 when it is not preloaded for operation.
Figure 5:
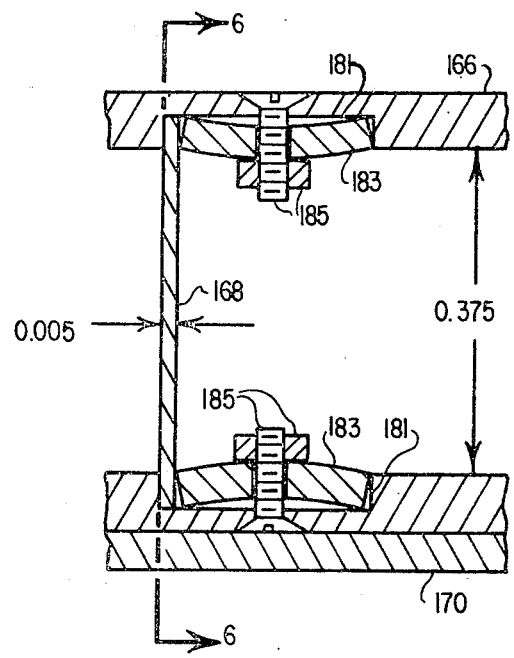

FIGS. 5 and 6 show the manner in which the rotationalmass springs and the linear-mass springs are mounted to their respective mounting plates and masses. As can be seen, the springs 162 and 168 are wedged in a slot 181 by rectangularly shaped wedge members 183. The wedge members 183 are held in position by nuts and bolts 185.

Turning now to the operation of the simplified slippage sensor element shown in FIGS. 4-7, as the vehicle's wheel 165 rotates the rotational-mass mounting plate 164 and the rotational mass 160 also rotate; however, the linear-mass mounting plate 170 and the linear-mass 166 are held stationary by the vehicle's frame 171. During periods of no wheel slippage when the velocity of the vehicle is constant, the rotational mass 160 and the linear mass 166 press against one another through the bearing assembly 172 with equal and opposite forces created by preloaded tensions in the rotational-mass springs 162 and the linear-mass springs 168.

Figure 7A:
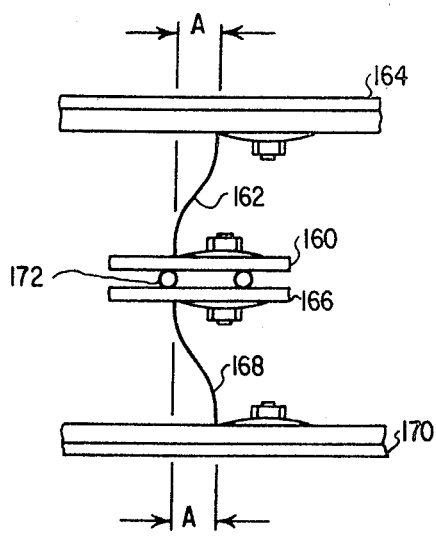
FIGS. 7a and 7b are close-up views of portions of the sensor unit shown in FIG. 4 when it is preloaded for operation.
Figure 7B:
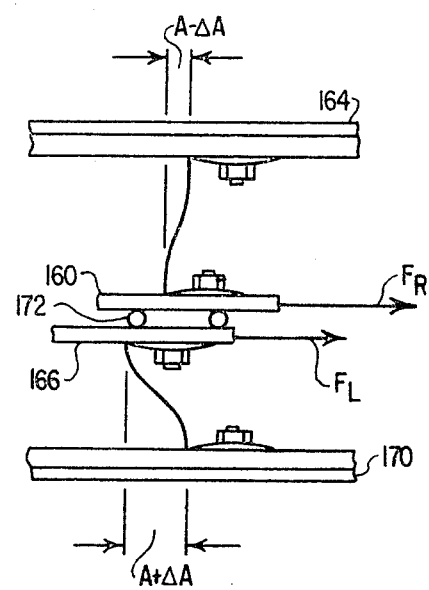

Before the brakes of the vehicle are applied, the configuration of the springs 162 and 168 are as shown in FIG. 7a. At this time the magnitude of the inertial forces $F_R$ and $F_L$ is zero. At the instant the brake lining contacts the brake drums, the vehicle begins to decelerate and $F_R$ and $F_L$, along with the degree of wheel slip, begin to increase in magnitude. As the values of $F_R$ and $F_L$ increase, their relationship is such as to cause the linear mass 166 and its attached switching magnet 180 to move to the left as shown in FIG. 7b. As indicated, this movement increases dimension A for linear mass 166 and decreases dimension A for rotational mass 160 (dimension A having a static value of approximately 0.033 inches). A continued increase in vehicular deceleration, with an associated increase in wheel slip, produces a continued increase in the relative displacement of the masses 166 and 160 as shown in FIG. 7b. If the ratio of $F_R$ and $F_L$ should now reach a critical magnitude the wheel will have reached, or nearly reached, a degree of slip corresponding to the point of maximum braking efficiency (see FIG. 1). When this condition exists, linear mass 166 and switching magnet 180 will have been displaced sufficiently so as to activate reed switch 64 thereby creating a slippage signal which activates the brake fluid locking device 38 shown in FIG. 3 and described above. The change in A from the instant deceleration begins until reed switch 64 is activated (shown as Δ A in FIG. 7b) is exaggerated in FIG. 7b for illustrative purposes only. The total movement of each of the sensing masses is quite small, i.e., between 0.004 and 0.005 of an inch.

If, rather than braked, a vehicle is suddenly accelerated thereby causing wheel slippage the linear mass 166, and the attached switching magnet 182, (shown in FIG. 4) move to the right thereby activating the accelerating magnetic reed switch 66 (shown in FIG. 3 but not shown in FIG. 4) and creating a slippage signal which activates the automatic accelerating control system 44 shown in FIG. 3.

FIGS. 8 and 9 show a practical embodiment of the slippage sensor element of FIGS. 4–7. Referring to FIG. 8, and using the same corresponding reference numerals as were used in FIGS. 4–7, even through the elements themselves may appear to be somewhat different in structure, the slippage sensor element 158 comprises a rotational mass 160, rotational mass springs 162, a rotational-mass mounting plate 164, a linear mass 166, linear mass springs 168, a linear-mass mounting plate 170, and a bearing assembly which includes a rotation bearing 184, a linear bearing 186 and a mounting plate bearing 188. As in the FIG. 4 embodiment, a switching magnet 180 is mounted at the top of the linear mass 166 and a switching magnet 182 is located at the bottom of the linear mass 166. The braking magnetic reed switch 64 (shown in the circuit in FIG. 3) is mounted on the linear-mass mounting plate 170 by a rivet 190 adjacent to the braking switching magnet 180. The accelerating magnetic reed switch 66 (shown in more detail in FIG. 3) is mounted on the linear-mass mounting plate 170 adjacent to the accelerating switching magnet 182.

The linear-mass mounting plate 170 is fixedly attached to a vehicle (not shown in FIG. 8) by a pin 192; thus, preventing rotation of the linear-mass mounting plate 170, the linear-mass springs 168, and the linear-mass 166 with attached switching magnets 180 and 182. The rotational-mass mounting plate 164, on the other hand, is fitted securely over the hub of a front brake drum (for a front wheel) or over the axle shaft (for a rear wheel) so that it rotates with the wheel. Also caused to rotate thereby are the rotational-mass springs 162 and the rotational mass 160. Relative rotational motion between the linear-mass mounting plate 170 and the rotation-mass mounting plate 164 is allowed by the mounting plate bearing 188. Relative rotational motion between the rotational mass 160 and the linear mass 166 is provided by the rotation bearing 184 and relative linear motion between the two masses is provided by the linear bearing 186. A transition member 194 separates the rotation bearing 184 from the linear bearing 186.

As was noted above in connection with FIGS. 4–7 the rotational-mass springs 162 and the linear-mass springs 168 are preloaded to some degree, as can also be seen in the cutaway portion of FIG. 8. The unloaded shapes of these springs are as shown in FIGS. 5 and 6. In this regard, the springs are preloaded by screwing a threaded tensioning member 196 onto the rotational-mass mounting plate 164. The tensioning member 196 applies a force on the mounting plate bearing 188 which is transmitted to the linear-mass mounting plate 170, the linear-mass springs 168, the linear mass 166, the linear bearing 186, the transition member 194, the rotation bearing 184, the rotational mass 160, the rotational-mass springs 162, back to the rotational-mass mounting plate 164. The amount of tension applied to the springs 162 and 168 depends on the extent to which the tensioning member 196 is screwed onto the rotational-mass mounting plate 164. Normally the rotation of the tensioning member 196 is continued until the dimension "A", in FIG. 7a is between 0.035 inches and 0.050 inches.

Dynamic seals 198 are attached to the rotational-mass mounting plate 164 and the tensioning member 196 to prevent contaminants from entering the slippage sensor element 158.

In operation, the embodiment of the slippage sensor unit 158 shown in FIG. 8 functions substantially the same as the slippage sensor unit shown and described in connection with FIGS. 4–7. That is, when there is no unusual acceleration, the deformed springs 162 and 168 cause the rotational mass 160 and the linear mass 166 to press against one another through the rotation bearing 184, the transition member 194 and the linear bearing 186. When, however, there is a disproportionate amount of angular acceleration as compared to the linear acceleration a disproportionate amount of pressing force is created which causes linear movement of the linear mass 166. This movement brings either the switching magnet 180 or the switching magnet 182 into a position in which it activates a magnetic reed switch 64 or 66 (these switches are shown in the FIG. 3 circuit).

The response time of the herein described automatic wheel braking control system is essentially the sum of the response times of: (1) the slippage sensing unit 158 (FIGS. 4 9); (2) the slippage sensor reed switch 64 (FIG. 3); (3) the energizing relay 74 (FIG. 3); and (4) the locking device 38 (FIG. 3).

Regarding the slippage sensing unit 158, the sensing masses do not wait to begin response until the degree of slippage which produces maximum efficiency is reached; but rather the movement of the masses, as required to activate the reed switch 64 shown in FIG. 3, actually begins at virtually the instant the brakes are applied, and simply terminates at the instant that the increasing slippage reaches the critical value. The sensor unit 158 and the reed switch 64 have a response time which, for practical purposes, is insignificant.

A solid-state relay is used as the energizing relay 74 because its switching action in response to an input signal is negligible for the purposes of this system.

The fourth and last component to respond is the brake fluid locking device 38. When the brakes of an automobile are applied, the brake fluid is in motion in the brake lines only until the brake lining contacts the brake drum. At this time motion of the fluid ceases and its sole function becomes that of transferring static pressure from the master cylinder to the wheel cylinders. To take advantage of this, the plunger 58 is always biased toward a seated position by its own weight. This bias is overcome by brake fluid flowing through the valve toward the wheel cylinder. As a result, an unseating force is applied to the plunger only until the brake lining contacts the brake drum. At this instant the plunger 58 begins to settle back toward the seated position so that, in the event of a panic stop, the solenoid need only be energized and a positive seating of the plunger is virtually instantaneously produced. This action isolates the wheel cylinder from further increases in static pressure.

In summary, the total response time of the automatic traction control system described above is extremely short, consequently should a vehicle's wheel reach some maximum braking efficiency slippage, regardless of its magnitude, the system is capable of stabilizing the brake fluid pressure essentially at the value which creates the wheel slippage. This pressure is maintained constant until: (1) the motion of the wheel returns to rolling due to an increase in coefficient of friction; (2) the operator releases pressure on the brake pedal; or (3) the vehicle comes to a complete stop. If any one or more of the preceeding conditions develop, brake control is automatically returned to the operator.

Another significant feature of the above described invention is that the slippage sensor unit detects both slippage due to braking a vehicle and accelerating a vehicle and therefore can be used with both braking and accelerating slippage control systems.

Still another advantageous feature of the above described system is the fact that it senses and controls the front and rear sets of wheels independently of one another.

It can be appreciated by those skilled in the art that the automatic traction control system described herein has been particularly described and shown with reference to a preferred embodiment. It will be understood by those skilled in the art that various changes in form and detail may be made therein without departing from the spirit and scope of the invention. For example, the plunger 58 could be made of a relatively light material, in which case the solenoid valve support spring 62 may not be necessary. Further, although the slippage sensor unit 158 (FIGS. 4–9) is illustrated and described herein for conventional drum type automobile brakes, its design can be altered to satisfy other brake systems such as disc type brakes. In addition, the respective numbers of rotational-mass springs 162 and linear-mass springs 168 are shown in FIG. 4 to be four per sensor unit, however, this number can be altered. Also, the system described herein in connection with an automobile can also be used with aircraft as well as other vehicles. In addition, the slippage detectors 36 a-d can be set to provide slippage warning signals before the actual maximum-traction efficiency point has been reached, as well as right at the maximum-traction efficiency point.

The embodiments of the invention in which an exclusive property or privilege is claimed are defined as follows:

1. In a braking system of the type having a braking element which upon activation of a brake pedal, is activated by fluid pressure applied to said braking element through a fluid line, an automatic braking device comprising:
   a slippage detector means for detecting wheel slippage and for producing an actuating signal in response to a wheel slippage which is related to a maximum wheel-traction efficiency slippage;
   a fluid-line locking means for locking said fluid line in response to said actuating signal and maintaining the fluid pressure applied to said braking element through said fluid line at a constant magnitude;
   wherein said wheel slippage detector is of the type which compares linear and angular accelerations of a wheel and comprises:
   an angular accelerometer means rotating with said wheel for measuring the angular acceleration of said wheel, said angular accelerometer means comprising first and second members which tend to move relative to one another in response to linear acceleration of said wheel;
   wherein said first members of said angular and linear accelerometers press against one another, each pressing with a force proportionate to the respective acceleration being measured.

2. In a braking system of the type having a braking element which upon activation of a brake pedal, is activated by fluid pressure applied to said braking element through a fluid line, an automatic braking device comprising:
   a slippage detector means for detecting wheel slippage and for producing an actuating signal in response to a wheel slippage which is related to a maximum wheel-traction efficiency slippage;
   a fluid-line locking means for locking said fluid line in response to said actuating signal and maintaining the fluid pressure applied to said braking element through said fluid line at a constant magnitude;
   wherein said fluid-line locking means includes:
   a valve which is ordinarily biased toward a closed position but which is opened by fluid flow in the direction of said braking element through said fluid line; and
   when a solenoid which when activated in response to an actuating signal creates a force tending to hold said valve tightly in a closed position.

3. An automatic braking device as claimed in claim 2 wherein said fluid-line locking means includes a bypass line for allowing fluid to flow freely away from said braking element, bypassing said valve.

4. An automatic braking device as claimed in claim 3 wherein said slippage detector means is of the type which compares linear and angular accelerations of a wheel and comprises:
   an angular accelerometer means rotating with said wheel for measuring the angular acceleration of said wheel, said angular acceleromoter means comprising first and second members which tend to move relative to one another in response to angular acceleration of said wheel; and
   a linear accelerometer means for measuring the linear acceleration of said wheel, said linear accelerometer means comprising first and second members which tend to move relative to one another in response to linear acceleration of said wheel,;
   wherein said first members of said angular and linear accelerometers press against one another, each pressing with a force proportionate to the respective acceleration being measured.

5. An automatic braking device as claimed in claim 2 wherein the extent to which said valve is biased toward a closed position is relatively slight so that a relatively insignificant pressure differential across said valve is required to open said valve when said solenoid is not energized.

6. An automatic braking device as claimed in claim 5 wherein said valve is gravity biased but wherein is further included a gravity countering means for reducing the effects of said gravity.

7. In an automatic braking system of the type having a braking element which is activated by fluid pressure applied to said braking element through a fluid line, an automatic braking device comprising:
   a slippage detector means for detecting wheel slippage and for producing an actuating signal in response to a wheel slippage which is related to a maximum wheel-traction efficiency slippage;
   a fluid-line locking means for locking said fluid line in response to said actuating signal, said fluid-line locking means including:
   a valve means including a valve element and a gravity biasing means for allowing gravity to ordinarily bias said valve element in a closed position but which is opened by fluid flow in the direction of said braking element through said fluid line; and a solenoid which when activated in response to said actuating signal creates a force tending to hold said valve tightly in the closed position.

8. An automatic braking system as claimed in claim 7 wherein said fluid-line locking means includes a by-pass means for allowing fluid to flow freely away from said braking element, bypassing said valve.

9. An automatic braking device as claimed in claim 7 wherein the extent to which said valve is gravity biased toward a closed position is relatively slight so that a relatively insignificant pressure differential across said valve is required to open said valve when said solenoid is not energized.

10. An automatic braking device as claimed in claim 9 wherein said gravity biasing means further includes a gravity countering means for countering the effects of said gravity bias toward a closed position.

11. An automatic braking device as claimed in claim 7 wherein said wheel slippage detector is of the type which compares linear and angular acceleration of a wheel and comprises:

an angular accelerometer means rotating with said wheel for measuring the angular acceleration of said wheel, said angular accelerometer means comprising first and second members which tend to move relative to one another in response to angular acceleration of said wheel;

a linear accelerometer means for measuring the linear acceleration of said wheel, said linear accelerometer comprising first and second members which tend to move relative to one another in response to linear acceleration of said wheel;

wherein said first members of said angular and linear accelerometers press against one another, each pressing with a force proportionate to the respective acceleration being measured.

* * * * *